Jan. 20, 1959   W. P. BAMFORD   2,869,287
METHOD OF BENDING GLASS SHEETS
Filed March 15, 1954   2 Sheets-Sheet 1

INVENTOR.
William P. Bamford
BY Nobbe & Swope
ATTORNEYS

Jan. 20, 1959

W. P. BAMFORD 2,869,287

METHOD OF BENDING GLASS SHEETS

Filed March 15, 1954

INVENTOR.
William P. Bamford
BY
Nobbe & Swope
ATTORNEYS

United States Patent Office 2,869,287
Patented Jan. 20, 1959

2,869,287

METHOD OF BENDING GLASS SHEETS

William P. Bamford, Maumee, Ohio, assignor to Libbey-Owens-Ford Glass Company, Toledo, Ohio, a corporation of Ohio Application March 15, 1954, Serial No. 416,178

3 Claims. (Cl. 49—84)

The present invention relates broadly to the art of bending sheets or plates of glass or like materials. More particularly, it has to do with a novel method of bending pattern-cut sheets of glass to increase the strength thereof by controlling the orientation or arrangement of their regional strain pattern during bending, and with bent glass sheets so strengthened.

The creation of regional strain, especially in sheet glass, or the resultant patterns thereof, as observed through a polariscope by color filter, has been known to be caused by the influence or close proximity of an adjoining body. Such strains are commonly expressed in terms of "tension" and "compression." It is normally to be expected, in a glass sheet which has been heated, that when such a sheet again cools to room temperature the strains therein will become stabilized. However, where the heating and subsequent cooling of the sheet is carried out on a framework, such as a bending mold, there is an obstruction or local resistance in certain areas to the normally expected or controlled rate of cooling or annealing of the glass.

Thus, in the bending of glass, it has been customary to bring the same to a softened condition within the heated zone of a furnace, cause it to settle onto the supporting or shaping surface of a mold and then allow the glass to cool or anneal in a controlled zone of gradually reduced temperature but while still retained on said supporting or shaping surface. This is especially true in the case of glass sheets that are to be subsequently laminated together for use as safety glass in automobiles. Laminated or safety glass ordinarily comprises two sheets of glass with an interposed layer of thermoplastic material, such as polyvinyl butyral resin, bonded together under the influence of heat and pressure to form a composite, transparent structure. In such cases, it is customary to bend the two sheets of glass simultaneously or in pairs.

Surprisingly enough, while the existence of regional strain patterns, particularly in glass that has been heated, bent and cooled, has been accepted as an obvious result of the heating and cooling of the glass on the bending mold, it has not heretofore been known that, by the proper disposition of the glass sheet with respect to the mold surface, the orientation of such strain patterns could be predeterminedly established throughout the body of the sheet. As herein disclosed, this invention contemplates locating the entire marginal edge portion or perimeter of a glass sheet to be bent in such relation to the mold structure that said marginal edge portion will be permitted to cool uniformly and thus set up therein a continuous band or region of compression, which will result in a structurally stronger edge materially more resistant to spalling, chipping or breakage.

It is therefore an important object of this invention to provide an improved method of bending glass sheets and for simultaneously orienting regional strains therein according to a predetermined pattern.

Another object of the invention is to provide a method of bending glass sheets wherein the marginal edge portions of the sheets are unsupported, or out of direct contact with the bending mold after bending to the end that said marginal edge portions can anneal uniformly and set up a resultant continuous outward area in compression.

Another object of the invention is to provide a method of supporting one or a pair of glass sheets at the opposite ends thereof above and aligned with the shaping surface of a bending mold, and causing the sheets or sheets when properly softened to settle onto the said shaping surface, with the entire marginal edge portions thereof projecting outwardly beyond said surface and free from contact therewith.

A further object of the invention is to provide an improved method of bending pattern-cut glass sheets in pairs wherein the outline of the shaping surface of the mold corresponds to but is relatively smaller than the outline of said sheets to create a continuous marginal area of substantially uniform width around the bent sheets that will be subject to a uniform rate of cooling and thereby placed in compression.

Other objects and advantages of the invention will be found in the following description when taken in connection with the accompanying drawings.

In the drawings, wherein like numerals are employed to designate like parts throughout the same:

The type of bending apparatus herein disclosed by way of example is basically well-known in the art and comprises what is commonly termed a "solid-ring" mold having a shaping surface of a curvature corresponding to that to be imparted to the glass. This invention is predicated on the important discovery that during bending of a glass sheet, the strain pattern therein can be oriented or arranged in specific areas of the glass sheet so that predetermined control of the regional strain pattern can be exercised in the bending of the sheet.

The bending of pattern-cut glass sheets is distinguishable from the bending of blank or block size sheets of glass in that certain types of curvatures, together with the length of the glass sheet, renders the bending much more simple and easily accomplished when the sheets are initially cut to the desired outline, which approximates the size and/or contoured edges of the opening of a car body. Also, where the curvature throughout is relatively shallow, the sheets are easily supported and bent on a solid-ring type mold without any great difficulty.

Figure 1:
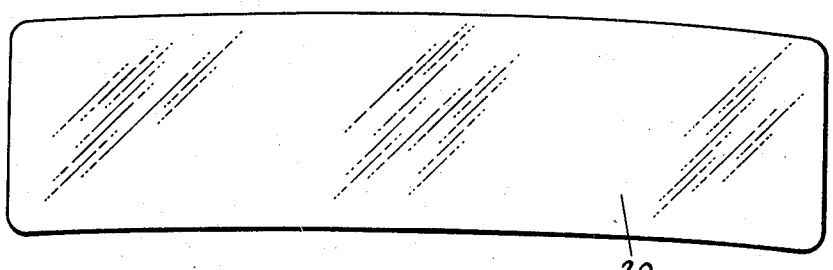
Fig. 1 is a plan view of a sheet of glass that has been cut in outline to a predetermined pattern.
Figure 2:
Fig. 2 is a side elevational view of a pair of glass sheets bent to a predetermined curvature.
Figure 3:
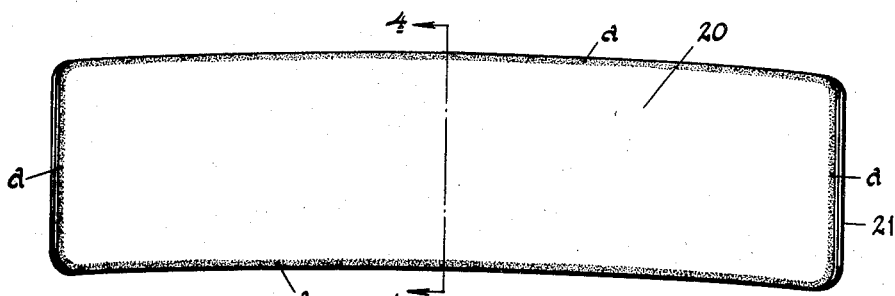
Fig. 3 is a plan view of a pair of glass sheets of the pattern-cut size of Fig. 1 and bent to the curvature shown in Fig. 2 and illustrating the regional pattern in compression obtained in accordance with this invention.
Figure 4:
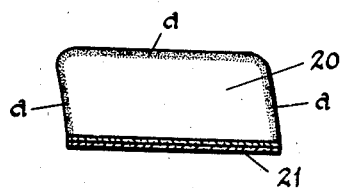
Fig. 4 is a transverse sectional view of the pair of bent sheets taken along line 4—4 of Fig. 3.

Referring now more particularly to the drawings, there is shown in Fig. 1 a flat sheet of glass 20 which has been pattern-cut to a desired outline. When two such sheets are combined as an optically matched pair, they may be simultaneously bent on a bending apparatus or mold of the type to be hereinafter described, to obtain a curvature through their longitudinal axis as is shown by way of example in Fig. 2. However, in accordance with this invention, when the sheets 20 and 21 are so bent and, in plan, appear as viewed in Fig. 3 the marginal areas thereof, when inspected by polariscope with color filter, will exhibit a continuous compression region, as denoted by the shaded area designated a. In other words, the bent sheet will have a continuous compression strip at and extending along the entire peripheral edge thereof. Inwardly of this compression region, there is a known region in tension and still inwardly throughout the center of the sheets there will be combined or blended areas of tension and compression which appear stabilized in the finally cooled sheets.

Figure 5:
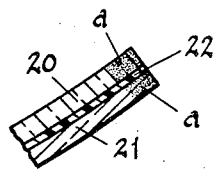
Fig. 5 is a fragmentary detail view of a pair of glass sheets, after laminating, and with the regional compression pattern indicated therein.
Figure 6:
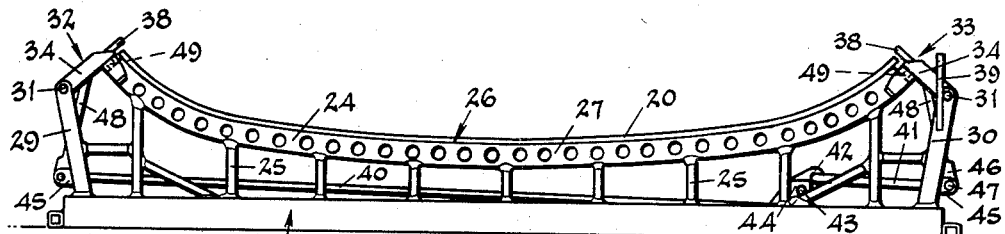
Fig. 6 is a side elevation of a bending apparatus for carrying out the method of this invention.
Figure 7:
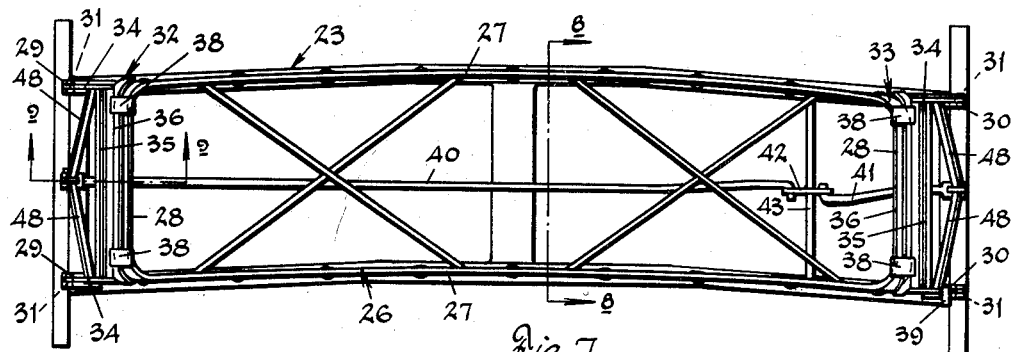
Fig. 7 is a plan view of the bending apparatus.
Figure 8:
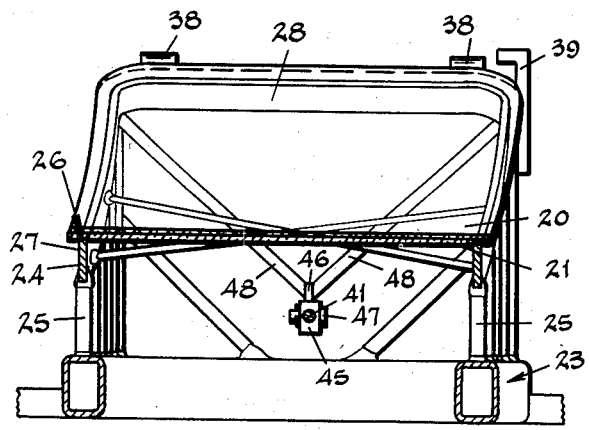
Fig. 8 is a transverse sectional view through the bending apparatus taken along line 8—8 of Fig. 7 and showing a pair of bent glass sheets thereon.
Figure 9:
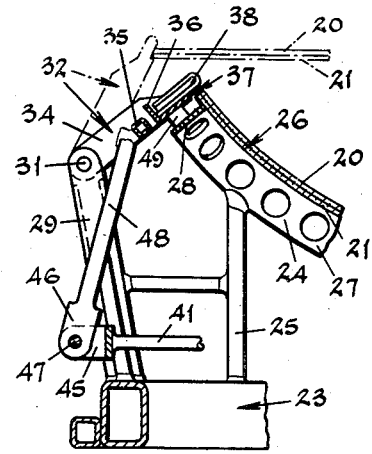
Fig. 9 is a fragmentary sectional view of one end of the bending apparatus, with the glass supporting members thereof in the closed position, and diagrammatically in the open position, as taken along line 9—9 of Fig. 7.
Figure 10:
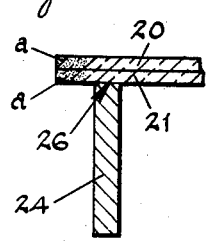
Fig. 10 is a fragmentary detail view illustrating the relation of the marginal edge portions of the glass sheets to the shaping surface of the bending apparatus.

It will thus be apparent that a pair of pattern-cut sheets, after being bent, can be laminated with an interlayer of thermoplastic material, such as polyvinyl butyral resin, to provide a composite safety-glass structure such as is shown in Fig. 5 and which comprises the two bent glass sheets 20 and 21, with a plastic interlayer 22. Such a laminated structure may take the form of an automobile windshield, which when viewed through a polariscope with color filter, the marginal edges of the sheets 20 and 21 on opposite sides of the plastic interlayer 22 will disclose continuous marginal areas, as indicated at a in Fig. 5, that are in compression and thereby structurally stronger and more resistant to breakage.

A bending apparatus, on which the method of this invention may be carried out is shown in Figs. 6 to 9 and comprises a rack or supporting base 23 on which a continuous rail or mold frame 24 is mounted by means of posts 25. The mold 24 thus affords a solid ring on the narrow upper surface of which the actual shaping surface 26 is provided. As viewed in these figures, it will be seen that the outline of the shaping surface conforms to that of the glass sheet 20 but is relatively smaller both longitudinally and transversely.

Arranged in the corners and at opposite ends of the base 23 are pairs of substantially upright posts 29 and 30 to the upper ends of which are pivotally mounted as at 31 glass supports 32 and 33. Each of the supports 32 and 33 comprises a pair of arms 34, carried at one end on the pins 31, and a transversely disposed cross-member 35. Extending between and secured to outer ends of said arms 34 is a bar 36 having outwardly directed curved ends and on the upper surface of which the actual supporting surface 37 for the glass sheets is provided. On the rear surface of each bar 36 are located stops 38 which engage the sheets when they are located on the surfaces 37. The supports 32 and 33 are thus adapted to be lifted outwardly and upwardly to a position indicated by broken line in Fig. 9 to receive the ends of the flat glass sheets thereon or to swing inwardly and downwardly, as the glass softens when properly heated, and guide the sheet to the position shown in full lines in Fig. 9. If desired, a post 39 may be secured to one of the uprights 30 to engage the adjacent arm 34 when the support 33 thereof reaches the upper limit of its swinging movement.

As more fully set forth in the Jendrisak patent, No. 2,554,572, the purpose of the glass supports 32 and 33 is to carry the glass sheets when flat and to be substantially spread apart since the glass at room temperature operates as a column or strut therebetween. However, as the glass, when properly heated, softens and settles onto the shaping surface 26 of the mold, the supports move inwardly and act to support the opposite ends of the sheets until substantially the entire body of the sheet is carried by said surface.

In order to synchronize the inward and downward motion of the supports 32 and 33 and thereby equalize the settling of the sheets at the opposite ends thereof, a linkage arrangement is provided in the form of links 40 and 41 and a rockable plate 42 pivotally carrying one end of each rod. The plate 42 is supported on a transversely disposed shaft 43 journaled at its ends in upright plates 44 attached to the base 23. The opposite ends of links 40 and 41 are equipped with bifurcated or forked connections 45 between the sides of which a plate 46 is interposed and supported on a pin 47. A plate 46 is fixedly carried by each of the supports 32 and 33 by means of braces 48. Since the links 40 and 41 are attached in common to the rockable plate 42, the inward or outward reciprocal movements of one will be transmitted to the other to synchronize the motion of the associated supports 32 and 33.

According to the present invention, as the sheets 20 and 21 approach complete support on the shaping surface 26, the supports 32 and 33 are brought to a stop by engagement with blocks 49 affixed to the outer surfaces of the end mold walls 28 and consequently when the extreme marginal edges of the sheets are supported by the portions of the shaping surface 26 on said end walls 28, there will be exposed margins of the sheets outwardly of the walls 28 and spaced from the surfaces 37 of the bars 36. And this will be produced by the position of the blocks 49 which limit inward movement of the supports 32 and 33 at a predetermined distance from the end mold walls 28. Thus, when the actual bending has been accomplished and the mold and sheets are conveyed into the annealing zone of the furnace, the longitudinal marginal edges of the sheets 20 and 21 will be located outwardly from the adjoining side walls 27 of the rail 24 and the end marginal edges of the sheets will similarly be located outwardly of the end mold walls 28. This will provide a continuous marginal area of the sheets 20 and 21 that is not subject to the residual heat of the mold rail and therefore will cool uniformly in the gradually reduced temperature of the annealing zone in the furnace.

In the bending of glass sheets in pairs, it has been customary to locate the two flat sheets to be bent one upon the other on an outline or peripheral-type mold which is then conveyed into and through a suitable furnace in which the glass is softened and the two sheets caused to bend downwardly to conform to the contour of the shaping surface of the mold. In accordance with the present invention, the mold is of a relatively smaller outline than the sheets with the result that when the sheets are supported on the actual shaping surface the marginal areas of the sheets will project beyond the mold and be free from contact therewith. Consequently when the mold and bent glass sheets thereon are conveyed into and through the annealing zone of the furnace, the projecting marginal edge portions of the sheets will neither be in contact with the mold nor influenced by the residual heat therein. This will permit the marginal edge portions to cool uniformly thereby placing the same in compression to produce a resultant structurally stronger and breakage-resistant continuous edge portion in the sheets.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. A method of producing pattern-cut bent glass sheets having greater resistance to edge breakage, which comprises supporting a pattern-cut flat sheet of glass in position to be bent relative to a ring-type mold having a relatively narrow substantially continuous shaping surface of substantially the same outline as the sheet but of a relatively smaller size, bending the glass sheet while at bending temperature to cause it to conform to the curvature of the mold around but inwardly of its pepriphery and with the marginal edge portions of the sheet projecting beyond said mold and free from contact therewith, and cooling the bent sheet while on said mold to place the marginal edge portions thereof in compression.

2. A method of producing pattern-cut bent glass sheets having greater resistance to edge breakage, which comprises supporting a pattern-cut flat sheet of glass in position to be bent relative to a ring-type mold having substantially the same outline as the sheet but of a relatively smaller size, bending the glass sheet while at bending temperature to cause it to conform to the curvature of the mold, and cooling the bent sheet while maintaining contact between the mold and said sheet around the entire periphery but inwardly of the outer edges of said sheet.

3. A method of producing a bent glass sheet as defined in claim 1, wherein the sheet is guided into contact with the mold shaping surface during the bending thereof to locate a continuous marginal edge area of the sheet outwardly of the mold shaping surface.

References Cited in the file of this patent

UNITED STATES PATENTS

| | | |
|---|---|---|
| 1,632,363 | Bull | July 14, 1927 |
| 1,980,970 | Morro | Nov. 13, 1934 |
| 1,999,558 | Black | Apr. 20, 1935 |
| 2,003,383 | Miller | June 4, 1935 |
| 2,176,999 | Miller | Oct. 24, 1939 |
| 2,218,654 | Paddock | Oct. 22, 1940 |
| 2,518,951 | Smith | Aug. 15, 1950 |
| 2,551,607 | Jendrisak | May 8, 1951 |
| 2,683,334 | Rugg et al. | July 13, 1954 |
| 2,695,476 | Jendrisak | Nov. 30, 1954 |
| 2,729,032 | White | Jan. 31, 1956 |